(12) United States Patent
Earanky (10) Patent No.: US 9,379,635 B2
(45) Date of Patent: Jun. 28, 2016

(54) SYSTEM AND METHOD FOR CONVERTING A SIGNAL WHILE MAINTAINING ELECTRICAL ISOLATION

(71) Applicant: Regal Beloit America, Inc., Beloit, WI (US)

(72) Inventor: Vijay K. Earanky, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 265 days.

(21) Appl. No.: 14/040,150

(22) Filed: Sep. 27, 2013

(65) Prior Publication Data

US 2015/0092466 A1     Apr. 2, 2015

(51) Int. Cl.
*H02M 3/335*     (2006.01)
*H02M 7/06*      (2006.01)
*F24F 11/00*     (2006.01)

(52) U.S. Cl.
CPC .............. *H02M 7/06* (2013.01); *F24F 11/0009* (2013.01); *H02M 3/33523* (2013.01); *H02M 3/33553* (2013.01)

(58) Field of Classification Search
CPC .............. H02M 7/06; H02M 3/33523; H02M 3/33553; F24F 11/0009
USPC ..................... 363/21.04, 21.07, 21.12, 21.15; 700/276
See application file for complete search history.

(56) References Cited

U.S. PATENT DOCUMENTS

| 5,410,230 | A | 4/1995 | Bessler et al. |
| 5,533,668 | A | 7/1996 | Erikson |
| 5,818,194 | A | 10/1998 | Nordby |
| 6,864,659 | B2 | 3/2005 | Ratz et al. |
| 7,048,537 | B2 | 5/2006 | Jaeschke et al. |
| 7,054,170 | B2 * | 5/2006 | Yang et al. .................. 363/21.18 |
| 7,377,120 | B2 | 5/2008 | Zikes |
| 7,795,827 | B2 * | 9/2010 | Jeung ........................ 318/400.04 |
| 7,899,395 | B2 * | 3/2011 | Martch et al. ................ 455/41.1 |
| 7,990,092 | B2 | 8/2011 | Woodward |
| 8,013,551 | B2 | 9/2011 | Woodward |
| 8,049,459 | B2 | 11/2011 | Woodward |
| 8,233,292 | B2 * | 7/2012 | Ren et al. .................... 363/21.12 |

(Continued)

FOREIGN PATENT DOCUMENTS

| CN | 101208856 A | 6/2008 |
| CN | 101208856 B | 3/2011 |

(Continued)

*Primary Examiner* — Timothy J Dole
*Assistant Examiner* — Htet Z Kyaw
(74) *Attorney, Agent, or Firm* — Michael Best & Friedrich LLP (57) ABSTRACT

A detection circuit for converting a control signal while maintaining electrical isolation between a first ground and a second ground. The detection circuit includes a first input configured to receive the control signal; a gate signal input configured to receive a gate signal; a transformer; an isolator; a rectifier; and an output electrically connected to the rectifier, the output configured to output the converted control signal. The transformer is configured to receive the control signal from the first input, transform the control signal into a transformed control signal, and output the transformed control signal. The isolator is configured to receive the gate signal from the gate signal input, and control the transformer in response to the gate signal. The rectifier is configured to receive the transformed control signal from the transformer, and convert the transformed control signal to a converted control signal.

20 Claims, 7 Drawing Sheets

(56) References Cited

U.S. PATENT DOCUMENTS

| | | | |
|---|---|---|---|
| 8,294,393 B2 | 10/2012 | Schock et al. | |
| 8,362,724 B2 | 1/2013 | Woodward | |
| 8,362,736 B2 | 1/2013 | Woodward | |
| 8,362,737 B2 | 1/2013 | Woodward | |
| 8,643,315 B2* | 2/2014 | Butler et al. | 318/3 |
| 8,847,526 B2* | 9/2014 | Solan et al. | 318/400.01 |
| 2004/0257837 A1* | 12/2004 | Xu et al. | 363/21.04 |
| 2007/0069683 A1* | 3/2007 | Pant et al. | 318/807 |
| 2007/0126372 A1* | 6/2007 | Huang et al. | 315/291 |
| 2011/0260671 A1 | 10/2011 | Jeung | |
| 2013/0200831 A1* | 8/2013 | Nakano et al. | 318/400.29 |

FOREIGN PATENT DOCUMENTS

| | | |
|---|---|---|
| EP | 1417746 A1 | 5/2004 |
| WO | 03007468 A1 | 1/2003 |
| WO | 2011133937 A2 | 10/2011 |

* cited by examiner

Fig. 7

SYSTEM AND METHOD FOR CONVERTING A SIGNAL WHILE MAINTAINING ELECTRICAL ISOLATION

BACKGROUND

The invention relates to a method of converting a control signal while maintaining electrical isolation. In one example, the invention relates to controlling an air-movement system (e.g., a heating, ventilation, and air condition system) while maintaining electrical isolation.

Typically, in heating, ventilation, and air condition (HVAC) systems, a thermostat uses an analog voltage to send commands to a compressor or fan motor drive to set a required speed. This is performed in a way that the analog voltage is set to correspond to a speed profile required by system operation. The analog voltage (i.e., source voltage) is typically referenced to HVAC system ground and is typically isolated from the ground of the compressor or fan motor drive.

Several methods exist to read the information from the analog voltage and convert the analog voltage to a speed profile. These methods often times use an isolated power source from the drive, which is provided to a sense circuit. The sense circuit measures the analog voltage and converts it to a digital signal for the drive processor to read. Often times, these sense circuits use pulse-width modulated (PWM) based topology. PWM based topology often times suffer from linearity. To mitigate linearity issues, the sense circuits are calibrated. Calibration is often times time consuming and adds cost to production. A different solution is desired.

SUMMARY

The present invention provides a low cost circuit that senses the analog voltage and outputs a converted analog voltage. The circuit converts the analog voltage while maintaining electrical isolation between the HVAC system ground and the compressor or fan motor drive ground. Thus, the converted analog voltage is not referenced to the HVAC system ground.

In one embodiment, the invention provides a detection circuit for converting a control signal while maintaining electrical isolation between a first ground and a second ground. The detection circuit includes a first input configured to receive the control signal; a gate signal input configured to receive a gate signal; a transformer electrically connected to the first input, and electrically connectable to the first ground and the second ground; an isolator electrically connected to the gate signal input, the transformer, and electrically connectable to the first ground and the second ground; a rectifier electrically connected to the transformer; and an output electrically connected to the rectifier, the output configured to output the converted control signal. The transformer is configured to receive the control signal from the first input, transform the control signal into a transformed control signal, and output the transformed control signal. The isolator is configured to receive the gate signal from the gate signal input, and control the transformer in response to the gate signal. The rectifier is configured to receive the transformed control signal from the transformer, and convert the transformed control signal to a converted control signal.

In another embodiment the invention provides a method of converting a control signal while maintaining electrical isolation between a first ground and a second ground. The method comprising receiving the control signal; receiving a gate signal; activating an isolator in response to the gate signal; selectively transforming the control signal into a transformed control signal according to the activation of the isolator; outputting the transformed control signal; converting the transformed control signal into a converted control signal; and outputting the converted control signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
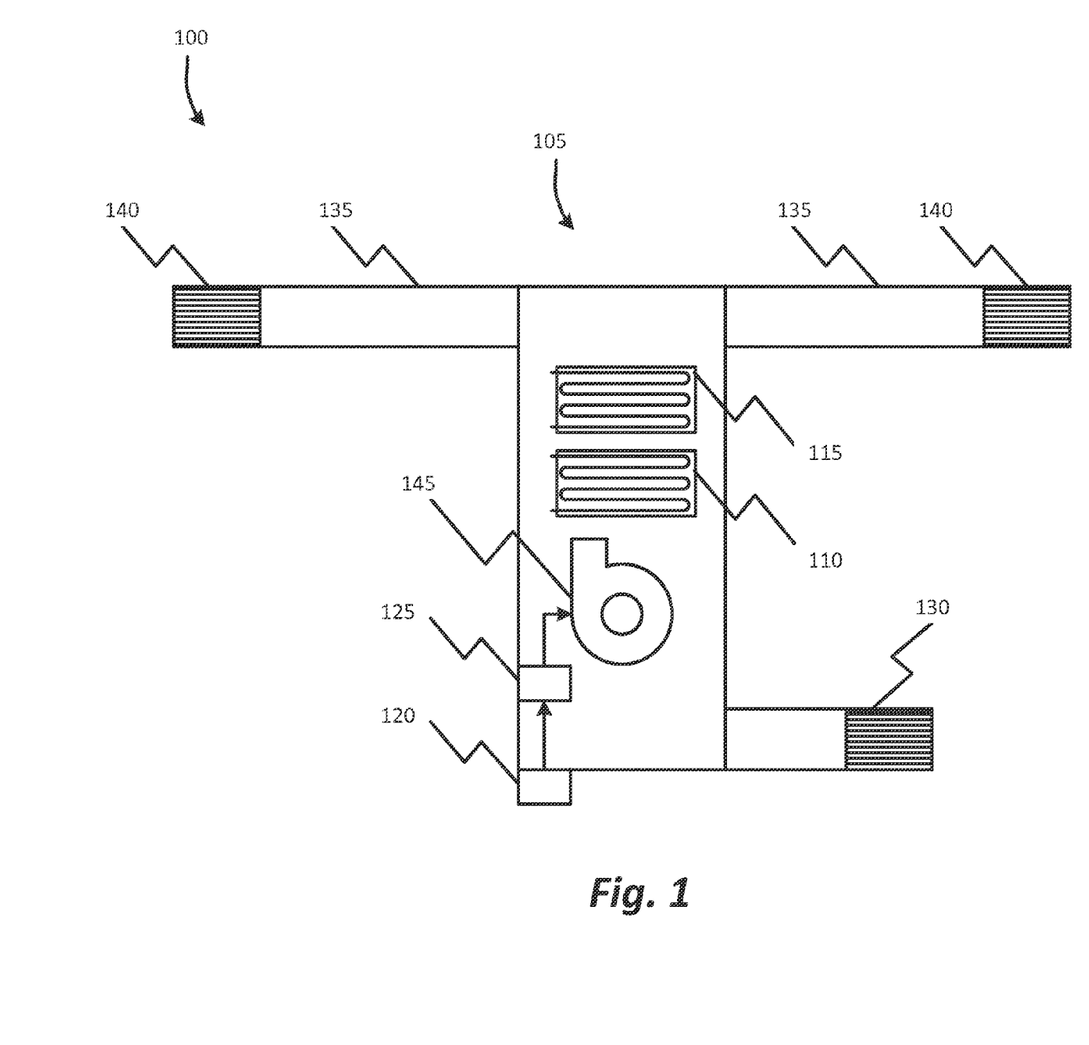
FIG. 1 illustrates a heating, ventilation, and air conditioning system according to one construction of the invention.

Although the invention described herein can be applied to, or used in conjunction with, a variety of systems in which electrical isolation is necessary, constructions of the invention described herein are described with respect to an air-movement system, such as the air-movement system of FIG. 1.

FIG. 1 illustrates a construction of an air-movement system. More specifically, the air-movement system is a heating, ventilation, and air conditioning (HVAC) system 100. In other constructions, the HVAC system 100 may have more or less components. The HVAC system 100 includes a ventilation system 105, a heater 110, an air conditioner 115, a thermostat 120, and a motor control system 125.

The ventilation system 105 circulates air within a building. In some implementations, the ventilation system 105 includes one or more ventilation inlets 130, a plurality of air ducts 135, one or more ventilation outlets 140, and a fan 145. Air is brought into the ventilation system 105 through ventilation inlets 130. The air is circulated through the ventilation system 105 via the plurality of air ducts 135. The air is then output to one or more rooms of the building through the ventilation outlets 140.

The fan 145 forcibly circulates the air through the ventilation system 105. In some constructions, the fan 145 includes a motor and an impeller. The motor converts electrical energy into mechanical energy, specifically rotational energy. The motor rotates the impeller. The rotating impeller forcibly moves the air through the ventilation system 105.

The heater 110 generates heat to be circulated through the ventilation system 105. The heater 110 emits heat into the ventilation system 105 as the air passes through the plurality of air ducts 135. In some constructions, the heater 110 may be one of a boiler, a furnace, a heat pump, a steam pump, etc. The hot air is then output through the one or more ventilation outlets 140.

The air conditioner 115 removes heat from the ventilation system 105, thus producing cool air. In some constructions, the air conditioner 115 uses refrigerant chemicals in order to remove the heat via a conduction process. In other constructions, the air conditioner 115 uses radiation or convection processes in order to remove the heat. In some constructions, the air conditioner 115 includes a compressor for cooling the air.

The thermostat 120 is operable to output a control signal used to control the HVAC system 100. For example, the thermostat 120 receives an input (e.g., a user signal) from a user and outputs a control signal. In some constructions, the thermostat 120 includes a thermostat controller 150 and a thermostat user-interface (UI) 155.

Figure 2:
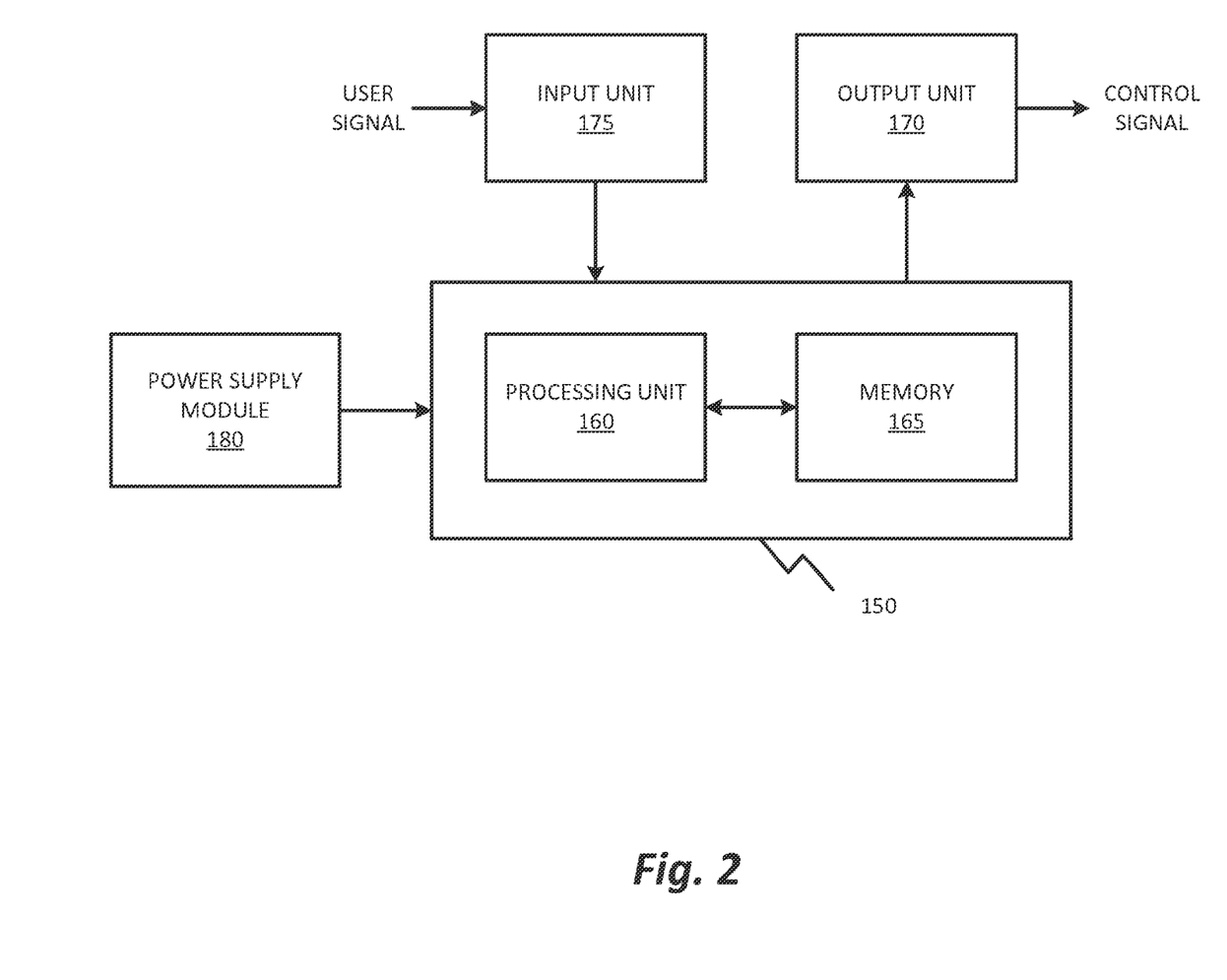
FIG. 2 is a block diagram illustrating a thermostat controller of the system of FIG. 1.

FIG. 2 is a block diagram illustrating the thermostat controller 150. In some constructions, the thermostat controller 150 includes a plurality of electrical and electronic components that provide power, operational control, and protection to the components and modules of the thermostat controller 150 and/or the thermostat 120. For example, the thermostat controller 150 includes, among other things, a processing unit 160, a memory 165, input units 175, and output units 170. The processing unit 160, the memory 165, input unit 175, and output unit 170, as well as various modules connected to the thermostat controller 150 are connected by one or more control and/or data buses. In some embodiments, the thermostat controller 150 is implemented partially or entirely on a semiconductor (e.g., a field-programmable gate array ["FPGA"] semiconductor) chip, such as a chip developed through a register transfer level ("RTL") design process.

The memory 165 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 160 is connected to the memory 165 and executes software instructions that are capable of being stored in a RAM of the memory 165 (e.g., during execution), a ROM of the memory 165 (e.g., on a generally permanent basis), or another non-transitory computer readable medium such as another memory or a disk. Software included in the implementation of the thermostat 120 can be stored in the memory 165. The software includes, for example, firmware, one or more applications, program data, filters, rules, one or more program modules, and other executable instructions. The thermostat controller 150 is configured to retrieve from memory and execute, among other things, instructions related to the control processes and methods described herein. In other constructions, the thermostat controller 150 includes additional, fewer, or different components.

A thermostat power supply module 180 supplies a nominal AC or DC voltage to the thermostat controller 150 and/or the thermostat 120. The thermostat power supply module 180 is powered by, for example, a power source having nominal line voltages between 100V and 240V and frequencies of approximately 50-60 Hz. The thermostat power supply module 180 is configured to supply lower voltages to operate circuits and components within the thermostat controller 150 and/or thermostat 120. In other embodiments, the thermostat power supply module 180 is powered by one or more batteries or battery packs, or another grid-independent power source (e.g., a generator, a solar panel, etc.).

Figure 3:
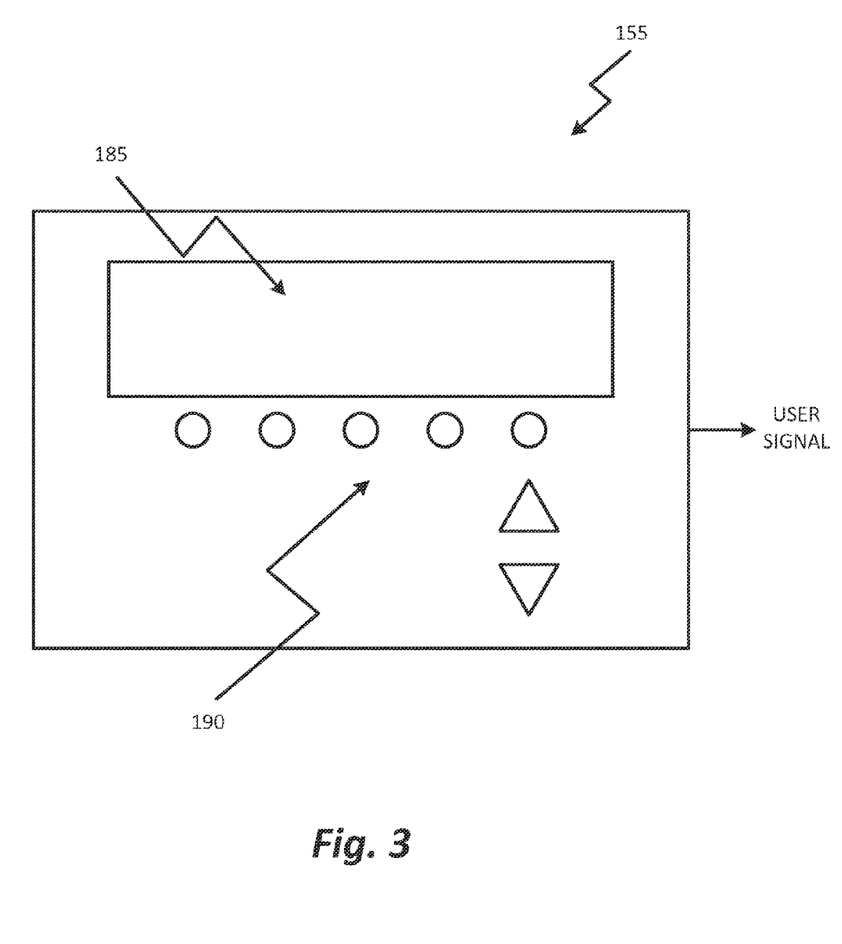
FIG. 3 illustrates a thermostat user-interface of the system of FIG. 1.

FIG. 3 illustrates the thermostat UI 155. The thermostat UI 155 is operable to receive an input from a user in order to control the thermostat controller 150 and/or the thermostat 120. The thermostat UI 155 receives an input from a user and outputs a user signal to the thermostat controller 150. The thermostat UI 155 includes a combination of digital and analog input or output devices required to achieve a desired level of control and monitoring of the HVAC system 100. For example, the thermostat UI 155 includes a display 185 and a plurality of input devices 190 (e.g., a plurality of push-buttons, knobs, dials, switches, a touch-screen display, etc.). The display 185 is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. For example, but not limited to, the thermostat UI 155 is operable to display a temperature setting and a measured temperature and further operable to receive a temperature setting from a user.

Figure 4:
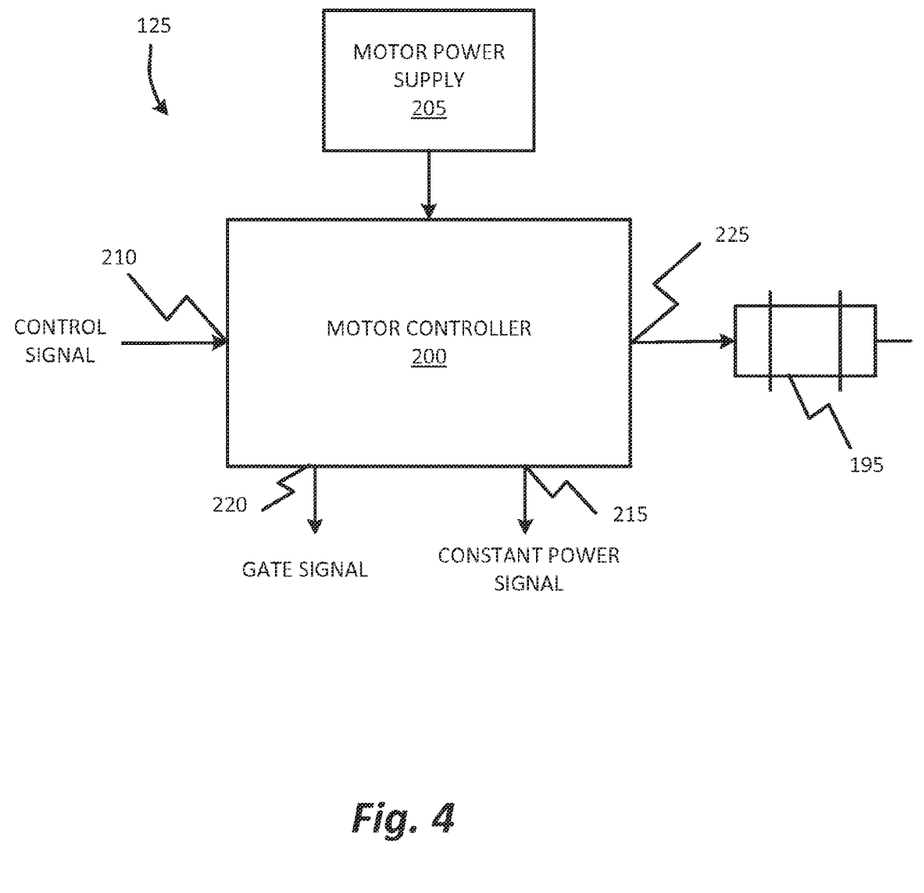
FIG. 4 is a block diagram illustrating a motor control system of the system of FIG. 1.

FIG. 4 is a block diagram illustrating the motor control system 125. The motor control system 125 is configured to receive the control signal, or a converted control signal, and control a motor 195 in response to the received control signal. In one construction, the motor 195 powers the fan 145. In another construction, the motor 195 powers the heat pump of the heater 110. In yet another construction, the motor 195 powers the compressor of the air conditioner 115. In yet another construction, the motor control system 125 controls the motors 195 which respectively power the fan 145, the heat pump of the heater 110, and the compressor of the air conditioner 115.

The motor control system 125 includes a motor controller 200. In one construction, the motor controller 200 includes substantially similar components to the thermostat controller 150. In other constructions, the motor controller 200 includes more or less components than the thermostat controller 150. For example, the motor controller 200 includes, among other things, a motor power supply 205, a control signal input 210, a constant power output 215, a gate signal output 220, and a motor control output 225.

The motor power supply 205 supplies a nominal DC voltage to the motor control system 125. The motor power supply 205 is powered by, for example, a power source having nominal line voltages between 100V and 240V and frequencies of approximately 50-60 Hz. The motor power supply 205 is configured to supply lower voltages to operate circuits and components within the motor control system 125.

The motor control system 125 receives the control signal, or converted control signal, at the control signal input 210. The motor control system 125 controls the motor 195, in response to the control signal, by outputting a motor power signal to the motor from the motor control output 225. The motor control system 120 outputs a constant power signal from the constant power output 215 and a gate signal from the gate signal output 220.

Figure 5:
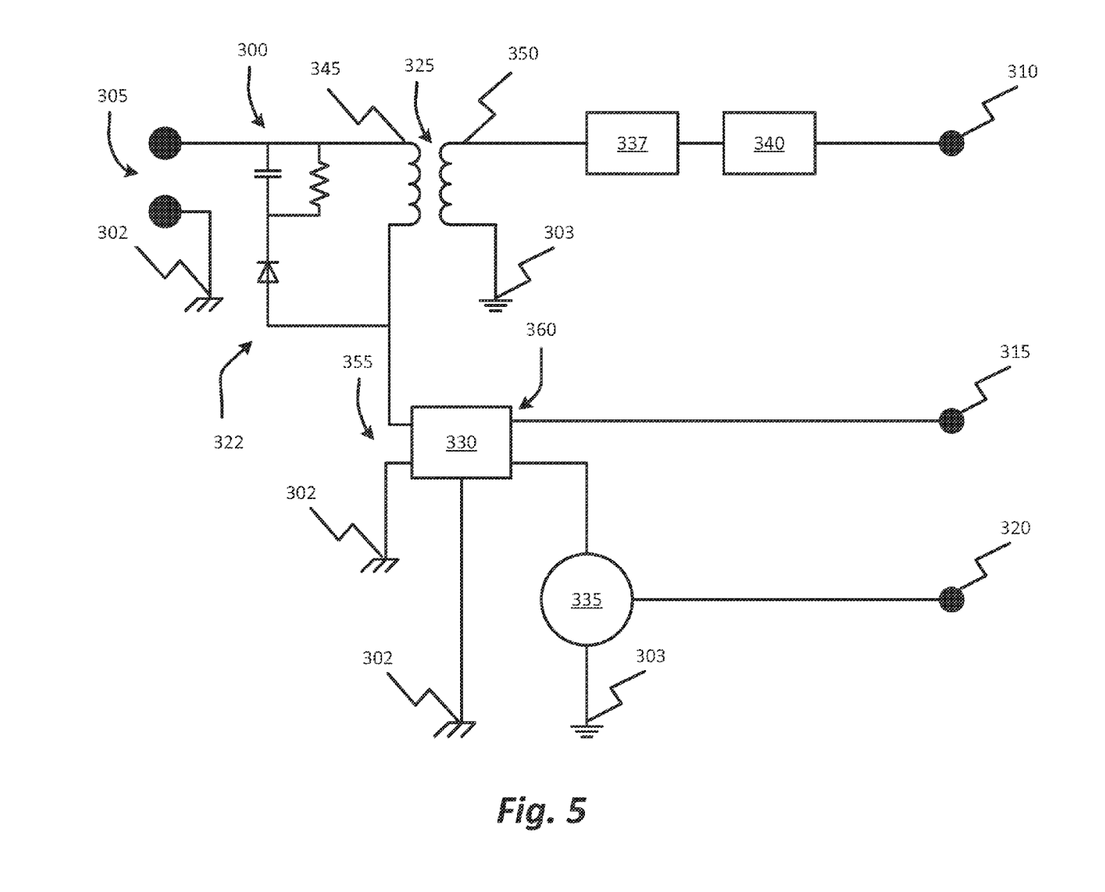
FIG. 5 is a block diagram/schematic illustrating a detection circuit of the system of FIG. 1.

FIG. 5 is a block diagram/schematic illustrating a detection circuit 300, according to one construction of the invention. The detection circuit 300 converts the control signal while maintaining electrical isolation between a first ground 302 and a second ground 303. In some constructions, the detection circuit 300 communicates the control signal from the thermostat controller 120 to the motor control system 125 while maintaining electrical isolation between the ground of the HVAC system 100 and thermostat controller 120 (e.g., the first ground 302) and the ground of motor control system 125 (e.g., the second ground 303).

The detection circuit 300 includes a control input 305, a control output 310, a constant power input 315, a gate signal input 320, a clamper 322, a transformer 325, an opto-isolator 330, a switch 335, a filter 337, and a rectifier 340, as well as various other components including but not limited to a plurality of resistors, capacitors, and diodes.

The detection circuit 300 receives the control signal from the thermostat 120 at the control input 305 and outputs a converted control signal at the control output 310 to the motor control system 125. In some constructions, the control signal and converted control signal correspond to a speed of the motor 195. In some embodiments, the control signal and the converted control signal have a linear relationship (i.e., 1V equals 1V, 2V equals 2V, etc.). In some constructions, the control signal and converted control signal are voltages ranging from approximately 0V-10V, which corresponds to the operation speed of the motor 195 (e.g., a control signal having 0V equals an operating speed at 0% of the maximum operating speed; a control signal having 2V equals an operating speed at 20% of the maximum operating speed; a control signal having 5V equals an operating speed at 50% of the maximum operating speed; a control signal having 10V equals an operating speed at 100% of the maximum operating speed; etc.).

The constant power input 315 receives a constant power supply (e.g., constant power signal). In some constructions, the constant power input 315 is approximately one of 5V, 10V, 15V, etc. In some embodiments the constant power supply is provided from the motor control system 125.

The gate signal input 320 receives a gate signal (e.g., a variable power signal). In some constructions, the gate signal has a fixed duty cycle (e.g., 15%, 20%, etc.). In other constructions, the gate signal is a pulse-width modulated (PWM) signal. In some embodiments, the gate signal is provided from the motor control system 125.

The clamper, or clamping circuit, 322 clamps, or limits, the voltage of the control signal received at a primary side 345 of the transformer 325. The voltage of the control signal is clamped in order to maintain the linear relationship between the control signal and the converted control signal. In the illustrated construction, the clamper 322 includes a capacitor, a resistor, and a diode. In other constructions, the clamper 322 includes more or less components.

The transformer 325 includes the primary side 345 and a secondary side 350. The transformer 325 transforms a signal (e.g., the control signal) received at the primary side 345 and outputs the transformed signal at the secondary side 350, while maintaining electrical isolation between the first ground 302 and the second ground 303. In some constructions, the transformer 325 includes a plurality of layers (i.e., a plurality of laminations) configured to reduce leakage inductance while providing substantially high galvanic isolation. A reduction of leakage inductance may promote the linear relationship between an input received at the primary side 345 and an output outputted at the secondary side 350. In some constructions, the transformer 325 provides approximately 3000V-4000V galvanic isolation between the primary side 345 and the secondary side 350, and thus between the first ground 302 and the second ground 303.

Figure 6:
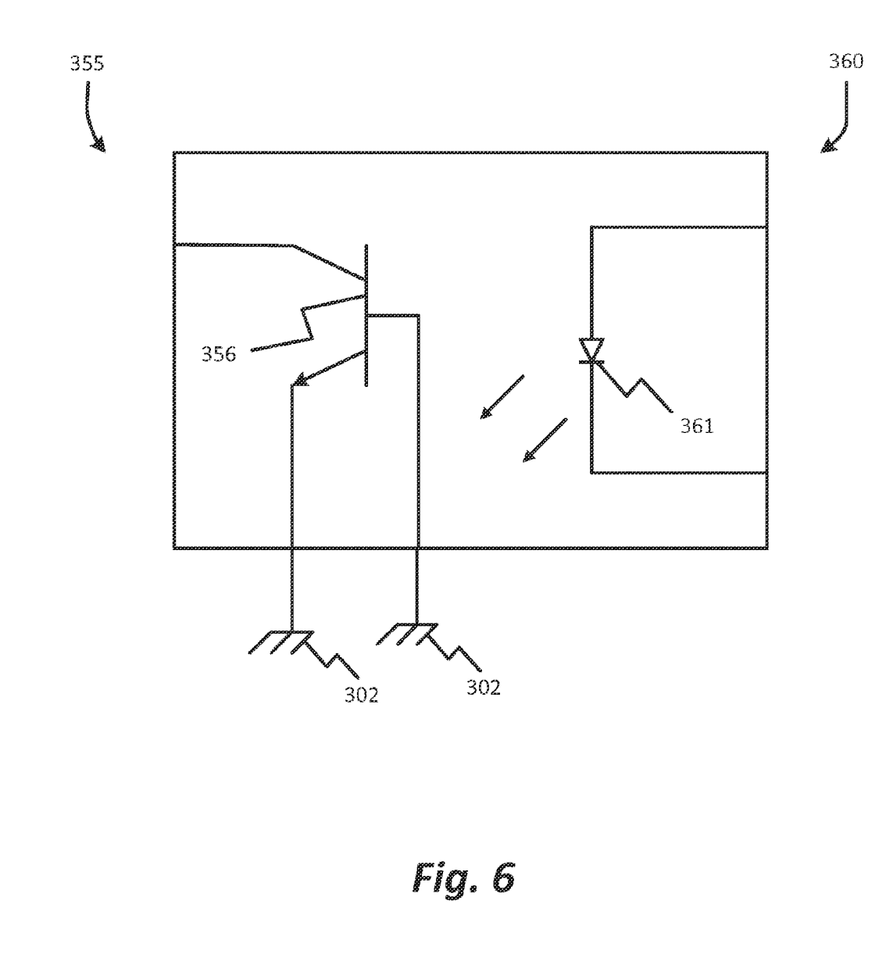
FIG. 6 is a schematic illustrating an opto-isolator of the detection circuit of FIG. 5.

FIG. 6 is a schematic illustrating the opto-isolator 330 according to one embodiment of the invention. The opto-isolator 330 includes a first side 355 and a second side 360. In some constructions, the first side 355 includes a switch 356 (e.g., a transistor, a photosensor, etc.), which allows the flow of current when activated (e.g., turned on) by light. The second side 360 includes a light source 361 (e.g., an LED, etc.), which emits light upon receiving power. Upon receiving power at the second side 360, the first side 355 is activated, thus allowing the flow of current through the first side 355.

The opto-isolator 330 is electrically connected to the primary side 345 of the transformer 235 and the first ground 302 at the first side 355. The opto-isolator 330 is further electrically connected to the constant power input 315, the second ground 303, and gate signal input 320, through the switch 335, on the second side 360.

The switch 335 selectively controls the flow of current in response to the gate signal. When the gate signal is high, current is allowed to flow. When the gate signal is low, current is not allowed to flow. In some constructions, the switch 335 is a power switch. In some constructions, the switch 335 is a transistor (e.g., FET, JFET, MOSFET, BJT, IGBT, etc.). In some embodiments, the opto-isolator 330 and the switch 335 are combined into an isolator.

Figure 7:
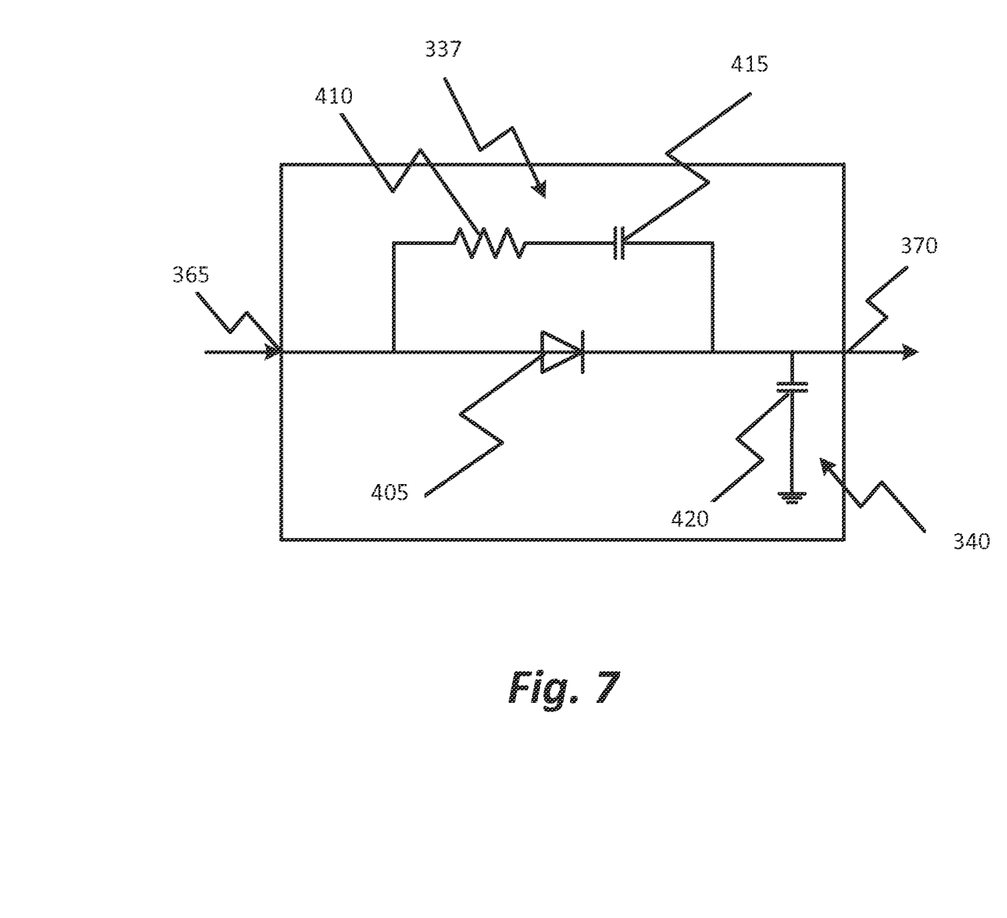
FIG. 7 is a schematic illustrating a rectifier and a filter of the detection circuit of FIG. 5.

FIG. 7 is a schematic illustrating a construction of the filter 337, a construction of the rectifier 340, an input 365, and an output 370. The filter 337 is configured to allow current to flow in one-direction, from the input 365 to the output 370. In illustrated construction, the filter 337 includes a diode 405, a resistor 410, and a capacitor 415. In such a construction, the diode 405 is operable to allow a voltage above a predetermined threshold to pass through filter 337, while the resistor 410 and the capacitor 415 allow a voltage below the predetermined threshold to pass through the filter 337. In other constructions, the filter 337 includes only the diode 405.

The rectifier 340 converts AC voltage to DC voltage. In the illustrated construction, the rectifier 340 includes one or more capacitors 420. In other constructions, the rectifier 340 further includes other components, such as but not limited to, one or more resistors and one or more diodes.

In operation, the thermostat UI 155 receives the user input and outputs the user signal according to the user input. The thermostat controller 150 receives the user signal and outputs a control signal. The motor control system 125 outputs the constant power signal and the gate signal.

The detection circuit 300 receives the control signal at the control input 305, receives the constant power signal at the constant input 315, and receives the gate signal at the gate signal input 320. The control signal is clamped by the clamper 337. The transformer 325 receives the control signal at the primary side 245 of the transformer 325. The opto-isolator 330 receives the constant power signal at the second side 360 of the opto-isolator 330 from the constant input 315. The switch 335 receives the gate signal from the gate signal input 320.

The switch 335 electrically connects the second side 360 of the opto-isolator 330 to the second ground 303 according to the received gate signal. Connecting the opto-isolator 330 to the second ground 303 allows current to flow from the constant power input 315 to the second ground 303, thus switching on the second side 360 of the opto-isolator 330, according to the gate signal.

Switching on the second side 360 of the opto-isolator 330 switches on the first side 355 of the opto-isolator 330, while maintaining electrical isolation between the first ground 302 and the second ground 303. Switching on the first side 355 of the opto-isolator 330 electrically connects the primary side 345 of the transformer 325 to the first ground 302, thus allowing current to flow, while maintaining electrical isolation between the first ground 302 and the second ground 303.

The chopping (e.g., selective switching according to the gate signal) converts the control signal to an AC-voltage control signal. The transformer 325 transforms the AC-voltage control signal and outputs the transformed AC-voltage control signal, while maintaining electrical isolation between the first ground 302 and the second ground 303. The transformed AC-voltage control signal is input into the input 365 and filtered through the filter 337. The filtered AC-voltage control signal is converted to a DC-voltage control signal by the rectifier 340. The converted control signal is output from the output 370 to the motor control system 125 through the control output 310. The converted control signal is linearly related to the received control signal (i.e., 1V equals 1V, 2V equals 2V, 5V equals 5V, etc.). In some constructions, the converted control signal is scaled up or down based on system requirements. Scaling the control signal up or down is performed by varying the turns ratio of the transformer 325.

Thus, the invention provides, among other things, a new and useful detection circuit for a heating, ventilation, and air conditioning system. Various features and advantages of the invention are set forth in the following claims.

What is claimed is:

1. A detection circuit for converting a control signal while maintaining electrical isolation between a first ground and a second ground, the detection circuit comprising:
    a first input configured to receive the control signal;
    a gate signal input configured to receive a gate signal;
    a transformer electrically connected to the first input, and electrically connectable to the first ground and the second ground, the transformer configured to
        receive the control signal from the first input,
        transform the control signal into a transformed control signal, and
        output the transformed control signal,
    an isolator electrically connected to the gate signal input, the transformer, and electrically connectable to the first ground and the second ground, the isolator configured to receive the gate signal from the gate signal input, and control the transformer in response to the gate signal,
    a rectifier electrically connected to the transformer, the rectifier configured to
        receive the transformed control signal from the transformer, and
        convert the transformed control signal to a converted control signal; and
    an output electrically connected to the rectifier, the output configured to output the converted control signal.

2. The detection circuit of claim 1, wherein the control signal and the converted control signal are linearly related.

3. The detection circuit of claim 1, wherein the isolator includes at least one of an opto-isolator and a switch.

4. The detection circuit of claim 1, wherein the control signal relates to a motor speed.

5. The detection circuit of claim 1, wherein the control signal includes a voltage having a range of 0-volts to 10-volts.

6. The detection circuit of claim 1, further comprising a clamper configured to clamp a voltage of the control signal.

7. The detection circuit of claim 1, further comprising a filter electrically connected to the transformer, the filter configured to prevent a flow of current into a secondary side of the transformer.

8. The detection circuit of claim 7, wherein the filter circuit includes at least one of a diode, a resistor, and a capacitor.

9. The detection circuit of claim 1, wherein the transformer provides approximately 3000-4000 volts galvanic isolation.

10. The detection circuit of claim 1, further comprising a constant power input electrically connected to the isolator, the constant power input configured to receive a constant power signal and output the constant power signal to the isolator.

11. A method of converting a control signal while maintaining electrical isolation between a first ground and a second ground, the method comprising:
    receiving the control signal;
    receiving a gate signal;
    activating an isolator in response to the gate signal;
    selectively transforming the control signal into a transformed control signal according to the activation of the isolator;
    outputting the transformed control signal;
    converting the transformed control signal into a converted control signal; and
    outputting the converted control signal.

12. The method of claim 11, wherein the received control signal and the converted control signal are linearly related.

13. The method of claim 11, wherein the isolator includes at least one of an opto-isolator and a switch.

14. The method of claim 11, wherein the control signal relates to a motor speed.

15. The method of claim 11, wherein the control signal includes a voltage having a range of 0-volts to 10-volts.

16. The method of claim 11, wherein the transformed control signal is converted from AC-voltage to DC-voltage.

17. The method of claim 11, further comprising filtering the transformed control signal.

18. The method of claim 11, further comprising receiving a constant power signal.

19. An air-movement system comprising:
    a first controller having a first ground, the first controller configured to receive a user input, and output a control signal;
    a second controller having a control signal input and a second ground, the second controller configured to control a motor, and output a gate signal; and
    a detection circuit including
        a first input electrically connected to the first controller, the first input configured to receive the control signal,
        a gate signal input electrically connected to the second controller, the gate signal input configured to receive the gate signal,
        a transformer electrically connected to the first input, the first ground, and the second ground, the transformer configured to
            receive the control signal from the first input,
            transform the control signal into a transformed control signal, and
            output the transformed control signal,
        an isolator electrically connected to the gate signal input, the transformer, the first ground and the second ground, the isolator configured to
            receive the gate signal,
            selectively electrically connect the transformer to the first ground
        according to the gate signal,
        a rectifier electrically connected to the transformer, the rectifier configured to convert the transformed control signal to a converted control signal, and
        an output electrically connected to the rectifier and the control signal input of the second controller, the output configured to output the converted control signal to the control signal input;
    wherein the second controller controls the motor in response to receiving the converted control signal.

20. The air-movement system of claim 19, wherein the transformer provides approximately 3000-4000 volts galvanic isolation.

* * * * *